(12) United States Patent
Oshina

(10) Patent No.: US 10,625,668 B2
(45) Date of Patent: Apr. 21, 2020

(54) ILLUMINATION PORTION FOR ILLUMINATING A ROOF OPENING PORTION OF A VEHICLE

(71) Applicant: KASAI KOGYO CO., LTD., Kanagawa (JP)

(72) Inventor: Masato Oshina, Isehara (JP)

(73) Assignee: KASAI KOGYO CO., LTD., Koza-Gun, Kangawa (JP)

( * ) Notice: Subject to any disclaimer, the term of this patent is extended or adjusted under 35 U.S.C. 154(b) by 0 days.

(21) Appl. No.: 16/329,934

(22) PCT Filed: Nov. 2, 2016

(86) PCT No.: PCT/JP2016/082709
§ 371 (c)(1),
(2) Date: Mar. 1, 2019

(87) PCT Pub. No.: WO2018/083771
PCT Pub. Date: May 11, 2018

(65) Prior Publication Data
US 2019/0184895 A1 Jun. 20, 2019

(51) Int. Cl.
*B60Q 3/51* (2017.01)
*B60Q 3/64* (2017.01)
(Continued)

(52) U.S. Cl.
CPC .............. *B60Q 3/51* (2017.02); *B60J 7/043* (2013.01); *B60Q 3/20* (2017.02); *B60Q 3/208* (2017.02);
(Continued)

(58) Field of Classification Search
CPC . B60Q 3/208; B60Q 3/64; B60Q 3/51; B60Q 3/54; B60J 7/043
See application file for complete search history.

(56) References Cited

U.S. PATENT DOCUMENTS

| 2011/0128755 A1* | 6/2011 | Ludwig | B60Q 3/74 362/555 |
| 2013/0058115 A1* | 3/2013 | Pfeil | G02B 6/001 362/511 |

(Continued)

FOREIGN PATENT DOCUMENTS

| DE | 102009038483 A1 | 2/2011 |
| EP | 1903359 A2 | 3/2008 |

(Continued)

OTHER PUBLICATIONS

International Search Report for International Application No. PCT/JP2016/082709 dated Feb. 7, 2017, Japan.

*Primary Examiner* — William N Harris
(74) *Attorney, Agent, or Firm* — United IP Counselors, LLC

(57) ABSTRACT

An illumination structure of the present invention is an illumination structure that lights a sunshade or a glass roof. The illumination structure includes: a frame-like first bracket coupled to a headliner along the circumferential edge of a headliner opening for reinforcing the headliner opening; a frame-like second bracket coupled to the first bracket so as to be overlaid on the back side of the first bracket for reinforcing the headliner opening in cooperation with the first bracket; and a light emitter held between the first bracket and the second bracket. Light from the light emitter is emitted through a gap between the first bracket and the second bracket.

14 Claims, 13 Drawing Sheets

(51) Int. Cl.
*B60J 7/043* (2006.01)
*F21V 8/00* (2006.01)
*B60Q 3/208* (2017.01)
*B60Q 3/20* (2017.01)
*G02B 1/04* (2006.01)

(52) U.S. Cl.
CPC .............. *B60Q 3/64* (2017.02); *G02B 1/045* (2013.01); *G02B 6/001* (2013.01); *G02B 6/0006* (2013.01); *G02B 1/046* (2013.01); *G02B 1/048* (2013.01)

(56) References Cited

U.S. PATENT DOCUMENTS

| | | | |
|---|---|---|---|
| 2015/0003093 A1* | 1/2015 | Omura | B60Q 3/51 362/511 |
| 2019/0001875 A1* | 1/2019 | Xu | B60Q 3/51 |
| 2019/0054856 A1* | 2/2019 | Salter | B60Q 3/64 |
| 2019/0135170 A1* | 5/2019 | Salter | H05B 33/0845 |

FOREIGN PATENT DOCUMENTS

| | | |
|---|---|---|
| EP | 2287042 A1 | 2/2011 |
| JP | 2001171429 A * | 6/2001 |
| JP | 2008-174132 A | 7/2008 |
| JP | 2011-126482 A | 6/2011 |
| JP | 2015-074328 A | 4/2015 |
| WO | 2006/128941 A2 | 12/2006 |

\* cited by examiner

ILLUMINATION PORTION FOR ILLUMINATING A ROOF OPENING PORTION OF A VEHICLE

CROSS-REFERENCE TO RELATED APPLICATIONS

This application is a National Stage Entry application of PCT International Application No. PCT/JP2016/082709, filed on Nov. 2, 2016, the entire contents of which are hereby incorporated by reference.

BACKGROUND

1. Technical Field

The present invention relates to an illumination structure.

2. Description of the Background

A conventional illumination structure lighting around the opening at the roof of a vehicle includes a lens provided at a gap between an inner circumferential headliner and an outer circumferential headliner. Light from the lens is diffused inside the cabin through the gap (Japanese Unexamined Patent Application Publication No. 2015-074328 (hereinafter referred to as "Patent Literature 1")).

While this illumination structure lights the inner circumferential headliner around the roof opening, the illumination structure does not light a sunshade or a glass roof which forms a sunroof provided at the roof opening. Further, the illumination structure requires the double-structure headliner, i.e., the inner circumferential headliner and the outer circumferential headliner.

Further, a conventional illumination structure lighting a sunshade or a glass roof is provided at a gap between a garnish at an inner circumferential edge of the outer circumferential headliner and a sunshade rail. Light is emitted from the illumination structure to the sunshade through the gap (Japanese Unexamined Patent Application Publication No. 2011-126482 (hereinafter referred to as "Patent Literature 2")).

While this illumination structure lights the sunshade or the glass roof, the garnish must be provided on the inner circumferential side relative to the headliner. Further, when the sunshade is open, light diffusing inside any vehicle structure, such as the lower surface of the sunshade or the upper surface of the garnish existing around the illumination structure, may reflect contrary to expectations and seen on the glass roof.

BRIEF SUMMARY

The present invention has been made in view of the problems described above, and an object thereof is to provide an illumination structure which provides the structure of the roof opening of a vehicle with a sophisticated enhanced appearance, and with which light incident on a sunshade or a glass roof reflects clearly.

In order to achieve the above-described object, the present invention features the following aspects.

(1) An illumination structure of the present invention is an illumination structure provided at a roof opening of a roof of a vehicle for lighting a sunshade or a glass roof, the roof opening including a roof panel opening being open at a roof panel and a headliner opening being open at a headliner covering a lower surface of the roof panel, the illumination structure including: a first bracket being frame-shaped and coupled to the headliner along a circumferential edge of the headliner opening for reinforcing the headliner opening; and a second bracket being frame-shaped and coupled to the first bracket so as to be overlaid on a back side of the first bracket for reinforcing the headliner opening in cooperation with the first bracket; and a light emitter held between the first bracket and the second bracket. Light from the light emitter is emitted through a gap between the first bracket and the second bracket.

(2) In the structure (1), the light emitter includes a side emitting optical fiber, and an LED module provided at an end of the optical fiber.

(3) In the structure (1) or (2), the first bracket includes, at its inner circumferential edge, a first light guide part including a back surface inclined obliquely backward toward the sunshade or the glass roof.

(4) In the structure (1) or (2), the second bracket includes, at its inner circumferential edge, a second light guide part including a front surface inclined obliquely backward toward the sunshade or the glass roof.

(5) In the structure (1) or (2), the first bracket includes, at its inner circumferential edge, a first light guide part including a back surface inclined obliquely backward toward the sunshade or the glass roof. The second bracket includes, at its inner circumferential edge, a second light guide part including a front surface inclined obliquely backward toward the sunshade or the glass roof. The first bracket includes a first recess formed together with the first light guide part and recessed frontward. The second bracket includes a second recess recessed backward adjacent to the second light guide part. The light emitter is held between the first recess and the second recess.

(6) In the structure (4) or (5), the second light guide part extends between the circumferential edge of the headliner opening and a circumferential edge of the roof panel opening so as to block light from the light emitter.

(7) In any of the structures (3) to (6), an angle of the inclination is constant over a circumferential edge of the roof opening.

The present invention provides an illumination structure which provides the structure of the roof opening of a vehicle with a sophisticated enhanced appearance, and with which light incident on the sunshade or the glass roof reflects clearly.

DETAILED DESCRIPTION

Embodiment

In the following, with reference to the drawings, a detailed description will be given of an embodiment for carrying out the present invention (hereinafter referred to as the embodiment). Note that, unless otherwise specified, the cabin side (the ground side, the vehicle bottom side) is the front side, and the roof panel side (the sky side, the vehicle top side) is the back side.

With reference to FIGS. 1 to 4, a brief description will be given of the structure of a roof 10 (referred to also as the ceiling) of a vehicle in which a sunroof 50 is installed.

Figure 1:
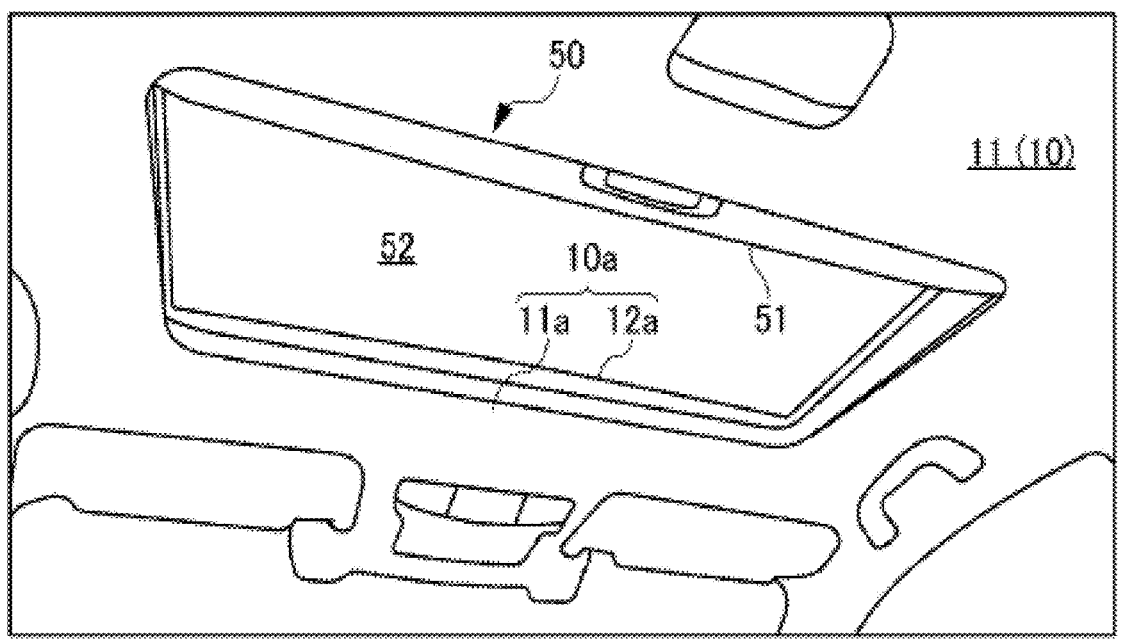
FIG. 1 shows the appearance of a roof opening when a roof is looked up obliquely frontward from the rear side in a vehicle with a sunshade being open in a bright ambient environment.
Figure 2:
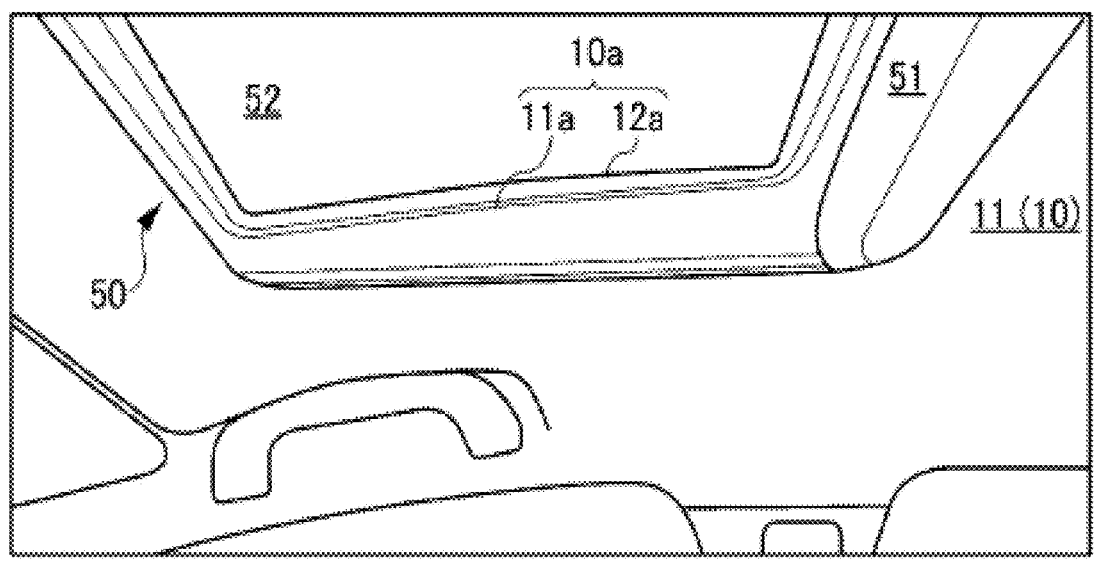
FIG. 2 shows the appearance of the roof opening when the roof is looked up obliquely rightward from the left side in the vehicle with the sunshade being open in a bright ambient environment.

FIG. 1 shows the appearance of a roof opening 10a when a roof 10 is looked up obliquely frontward from the rear side in a vehicle with a sunshade 51 being open in a bright ambient environment. FIG. 2 shows the appearance of the roof opening 10a when the roof 10 is looked up obliquely rightward from the left side in the vehicle with the sunshade 51 being open in a bright ambient environment.

As shown in FIGS. 1 and 2, the roof 10 of the vehicle includes a not-shown roof panel 12, and a headliner 11 (also referred to as a roof liner or a head lining) covering the lower surface of the roof panel 12.

The roof 10 has a roof opening 10a on the vehicle front side. The roof opening 10a is formed of a roof panel opening 12a of the roof panel 12 and a headliner opening 11a of the headliner 11. The roof panel opening 12a and the headliner opening 11a are substantially identical to each other in shape.

In the roof panel opening 12a, a sunroof 50 is installed.

The sunroof 50 includes a glass roof 52 disposed so as to close the roof panel opening 12a, and a sunshade 51 slidably disposed on the front side of the glass roof 52 so as to open or close the headliner opening 11a thereby exposing or covering the lower surface of the glass roof 52.

The shape and size of the sunshade 51 and those of the glass roof 52 are substantially identical to those of the roof opening 10a.

Figure 3:
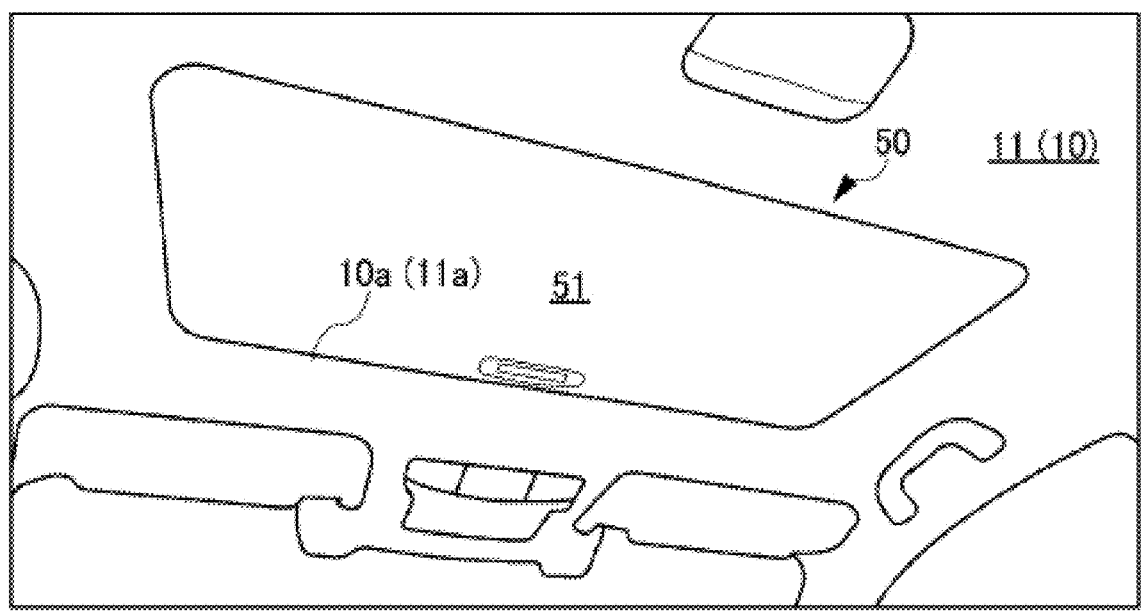
FIG. 3 shows the appearance of the roof opening when the roof is looked up obliquely frontward from the rear side in the vehicle with the sunshade being closed in a bright ambient environment.
Figure 4:
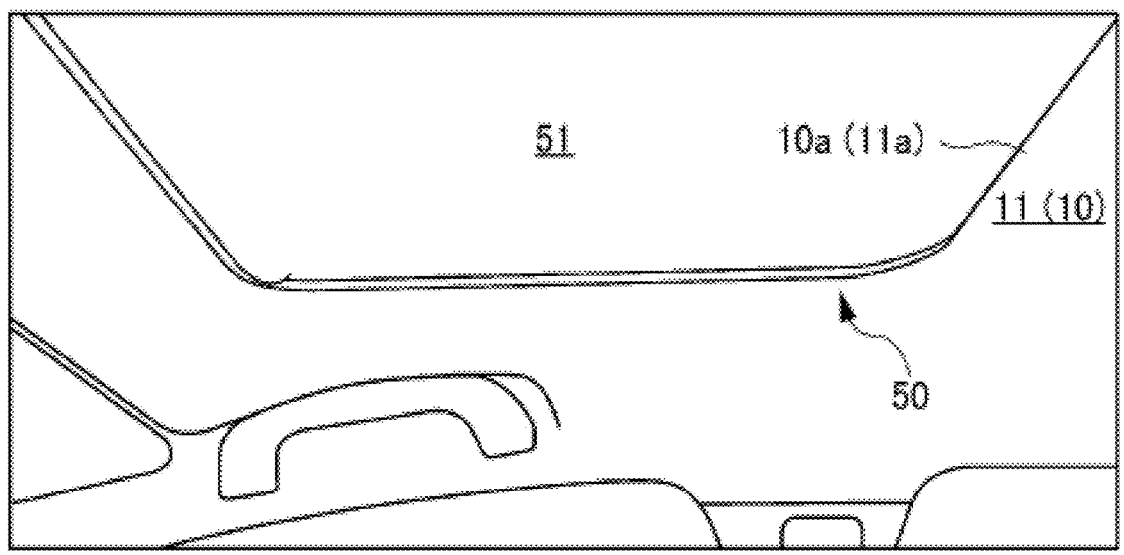
FIG. 4 shows the appearance of the roof opening when the roof is looked up obliquely rightward from the left side in the vehicle with the sunshade being closed in a bright ambient environment.

FIG. 3 shows the appearance of the roof opening 10a when the roof 10 is looked up obliquely frontward from the rear side in the vehicle with the sunshade 51 being closed in a bright ambient environment. FIG. 4 shows the appearance of the roof opening 10a when the roof 10 is looked up obliquely rightward from the left side in the vehicle with the sunshade 51 being closed in a bright ambient environment.

As shown in FIGS. 3 and 4, when the sunshade 51 is slid to close the roof opening 10a, the sunshade 51 entirely covers the lower surface of the glass roof 52 which is not shown, thereby closing the roof opening 10a.

Next, with reference to FIGS. 5 and 6, a description will be given of the state of indirect lighting executed by an illumination structure 100 when the sunshade 51 is closed. Note that, in FIGS. 5 and 6, L indicates the portion where light reflects.

Figure 5:
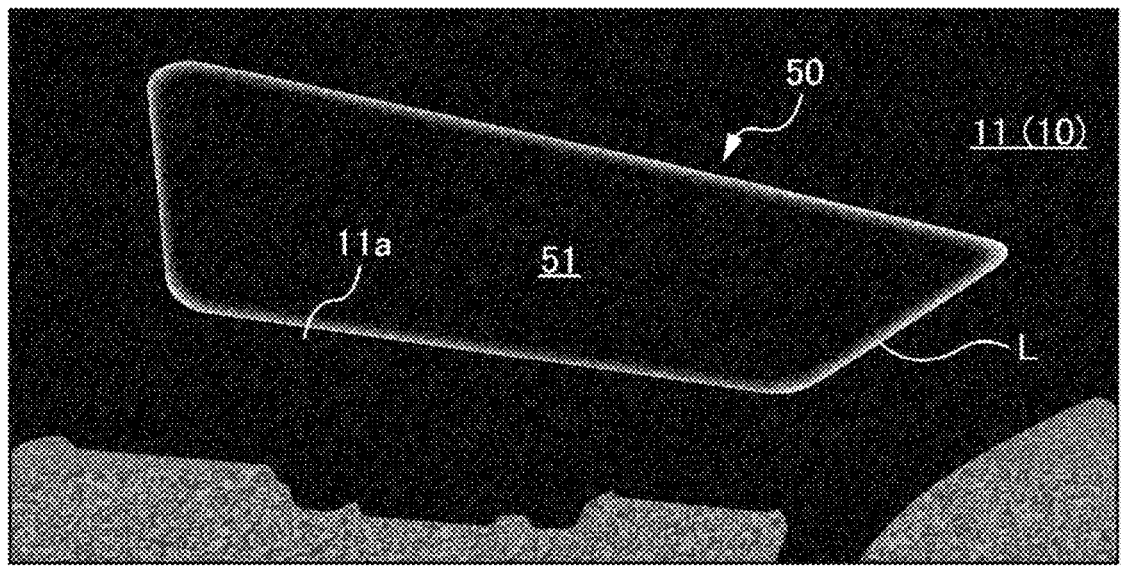
FIG. 5 shows the appearance of the roof opening when the roof is looked up obliquely frontward from the rear side in the vehicle with the sunshade being closed in a dark ambient environment.

FIG. 5 shows the appearance of the roof opening 10a when the roof 10 is looked up obliquely frontward from the rear side in the vehicle with the sunshade 51 being closed in a dark ambient environment.

Figure 6:
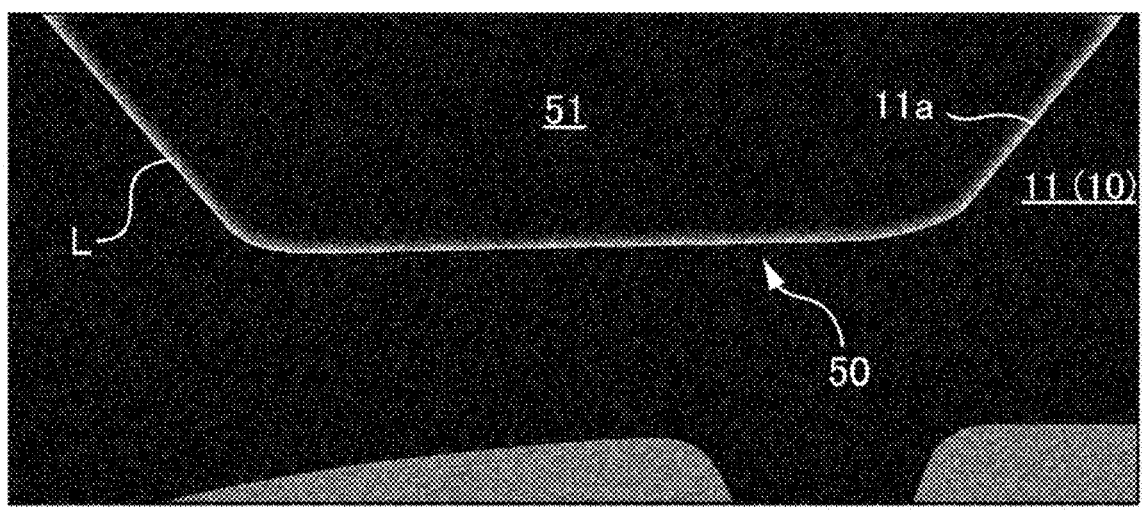
FIG. 6 shows the appearance of the roof opening when the roof is looked up obliquely rightward from the left side in the vehicle with the sunshade being closed in a dark ambient environment.

FIG. 6 shows the appearance of the roof opening 10a when the roof 10 is looked up obliquely rightward from the left side in the vehicle with the sunshade 51 being closed in a dark ambient environment.

As shown in FIGS. 5 and 6, on the back side of the headliner 11, as will be detailed later, a light emitter 30 forming the illumination structure 100, which is not shown, is provided. Therefore, when the sunshade 51 is closed in a dark ambient environment, light emitted from the light emitter 30 annularly lights the front surface of the circumferential edge of the sunshade 51 along the circumferential edge of the headliner opening 11a, and appears as indicated by L in the drawings.

The light lighting the front surface of the sunshade 51 is reflected inside the cabin, implementing indirect lighting that lights inside the cabin.

Further, the light reflected at the sunshade 51 is partially blocked by the circumferential edge of the headliner opening 11a before lighting inside the cabin. This increases the contrast between the front surface of the circumferential edge of the headliner opening 11a and the front surface of the circumferential edge of the sunshade 51.

Thus, inside the cabin, the headliner opening 11a is visually distinguishing, exhibiting an excellent aesthetic effect.

Figure 7:
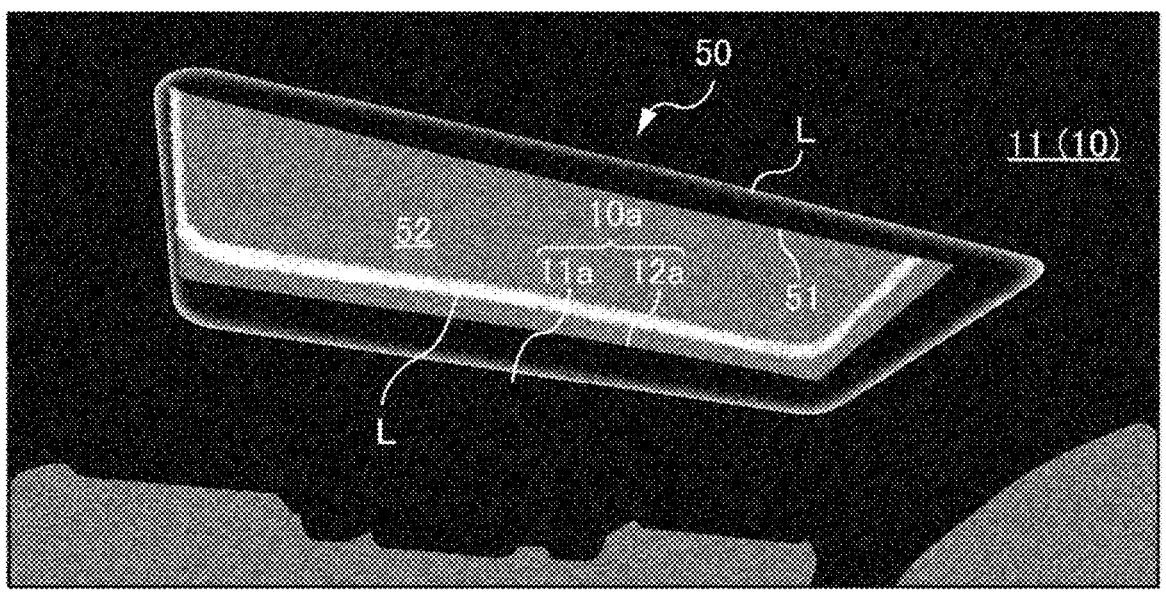
FIG. 7 shows the appearance of the roof opening when the roof is looked up obliquely frontward from the rear side in the vehicle with the sunshade being open in a dark ambient environment.

Subsequently, with reference to FIGS. 7 and 8, a description will be given of the state of indirect lighting executed by the illumination structure 100 with the sunshade 51 being open. Note that, in FIGS. 7 and 8, L indicates the portion where light reflects. FIG. 7 shows the appearance of the roof opening 10a when the roof 10 is looked up obliquely frontward from the rear side in the vehicle with the sunshade 51 being open in a dark ambient environment.

Figure 8:
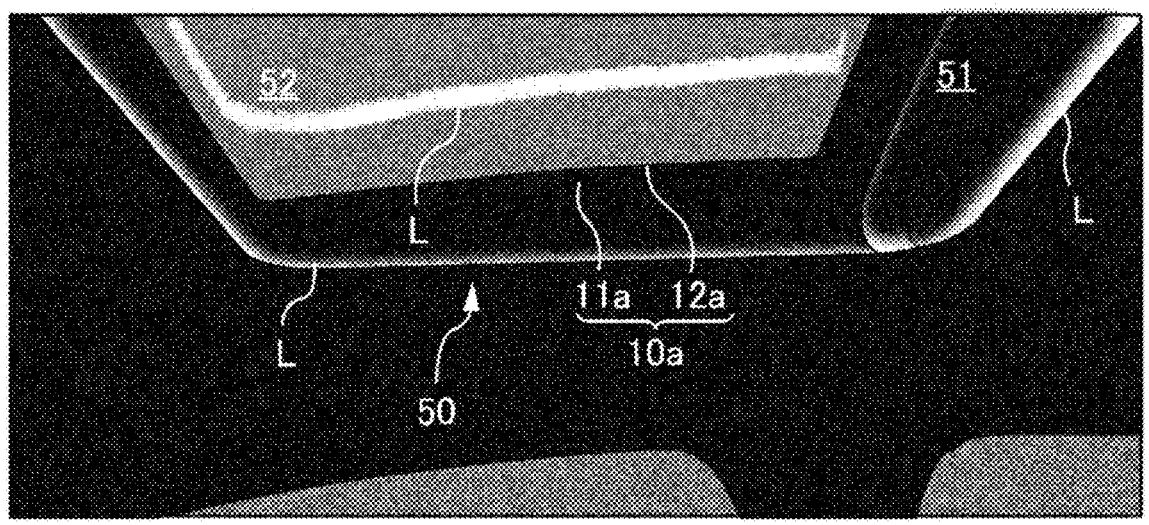
FIG. 8 shows the appearance of the roof opening when the roof is looked up obliquely rightward from the left side in the vehicle with the sunshade being open in a dark ambient environment.

FIG. 8 shows the appearance of the roof opening 10a when the roof 10 is looked up obliquely rightward from the left side in the vehicle with the sunshade 51 being open in a dark ambient environment.

On the back side of the headliner 11, the light emitter 30 forming the not-shown illumination structure 100 is provided. Therefore, as shown in FIGS. 7 and 8, when the sunshade 51 is open in a dark ambient environment, while the rear half of light emitted from the light emitter 30 is blocked by the sunshade 51, the rest of the light lights along the circumferential edge of the front surface of the glass roof 52 disposed on the back side of the sunshade 51 as indicated by L in the drawings along the circumferential edge of the roof panel opening 12a without being blocked by the sunshade 51.

Part of the light lighting the front surface of the glass roof 52 is reflected into the cabin, implementing indirect lighting that lights inside the cabin.

Further, the light emitted from the light emitter 30 is partially blocked by a second bracket 40, which will be described later, before reaching the glass roof 52. This forms a high-contrast portion at the front surface of the glass roof 52 between the portion directly lit by the light from the light emitter 30 and the portion shielded from the light from the light emitter 30. This high-contrast portion reflects light into the cabin.

Further, the distance from the light emitter 30 to the glass roof 52 causes the light lighting the glass roof 52 to appear as sharp linear light floating backward than the glass roof 52 by that distance as seen in the cabin. Thus, an excellent aesthetic effect is exhibited.

Next, with reference to FIGS. 9 and 10, a description will be given of the illumination structure 100 according to the present embodiment.

Figure 9:
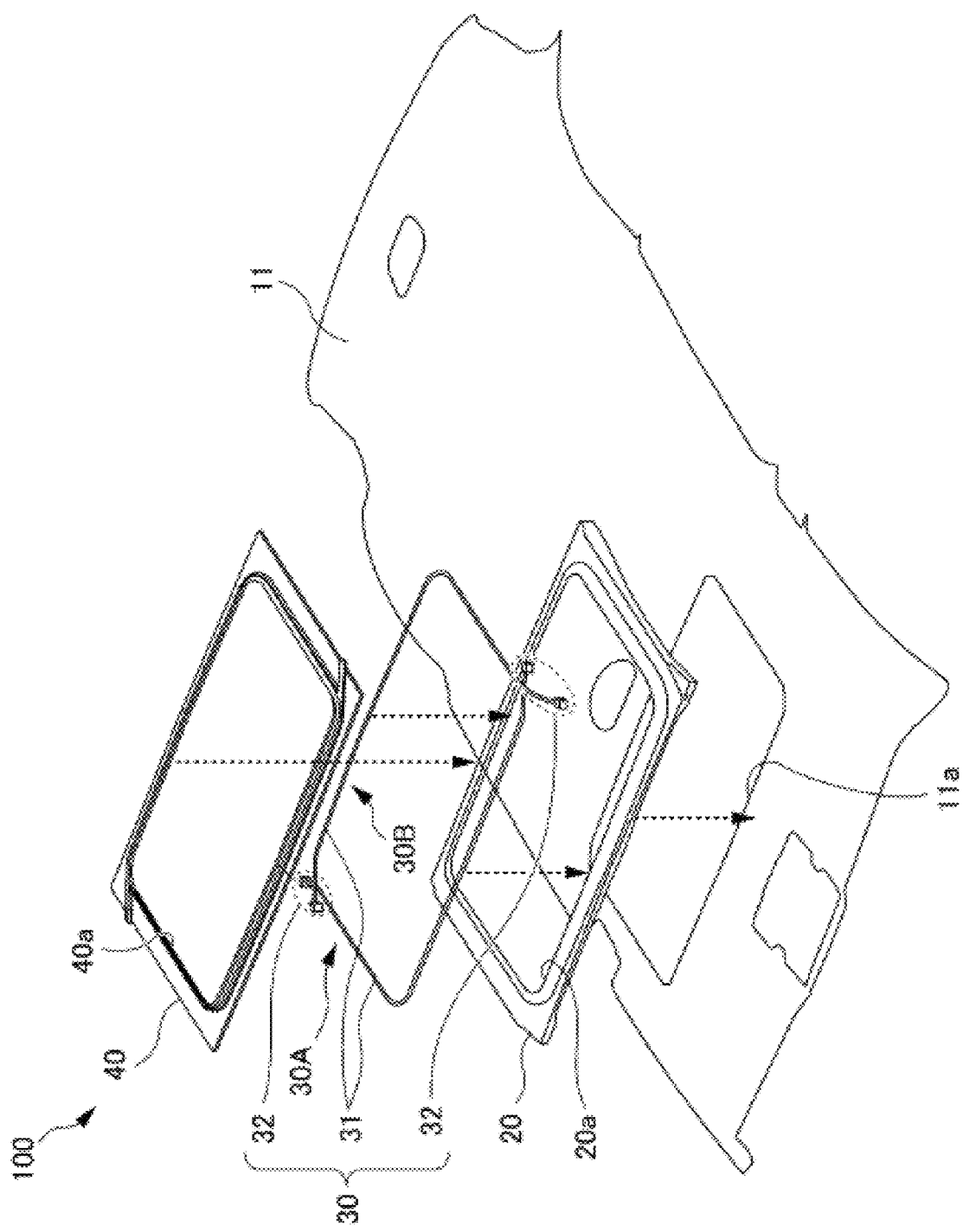
FIG. 9 is an exploded view of an illumination structure when a headliner is obliquely looked down.

FIG. 9 is an exploded view of the illumination structure 100 when the headliner 11 according to the present embodiment is obliquely looked down. FIG. 10 is a plan view of the illumination structure when the headliner is looked down. Note that, in FIGS. 9 and 10, the sunroof 50 (the sunshade 51 and the glass roof 52) and the roof panel 12 are not shown.

As shown in FIG. 9, the illumination structure 100 is coupled to the headliner 11 along the circumferential edge of the headliner opening 11a. Specifically, the illumination structure 100 includes a frame-like first bracket 20 for reinforcing the headliner opening 11a, a frame-like second bracket 40 coupled to the first bracket 20 so as to be overlaid on the back side of the first bracket 20 for reinforcing the first bracket 20, and a light emitter 30 held between the first bracket 20 and the second bracket 40.

In such an illumination structure 100, light emitted from the light emitter 30 is emitted through the gap between the first bracket 20 and the second bracket 40 and lights the sunshade 51 or the glass roof 52 provided at the roof opening 10a.

The first bracket 20 is a frame-like element whose inner shape is substantially identical to or slightly greater than the inner shape of the headliner opening 11a, and formed of resin such as ABS.

The first bracket 20 is painted black so as to prevent transmission of emitted light and excessive dispersion of reflected light. Note that, the color is not necessarily black so long as the equivalent function is exhibited. Alternatively, instead of painting, carbon black may be blended into the material to color the component. Further, white color may be selected to intentionally enhance the reflectivity for different aesthetic effect incorporating the customer preference.

The first bracket 20 is coupled to a base member formed of resin and provided on the back side of the headliner opening 11a by screwing, ultrasonic welding, heat sealing (a hot melt adhesive) or the like.

The light emitter 30 includes a side emitting optical fiber 31, and LED modules 32 respectively provided at the ends of the optical fiber 31. The light emitter 30 is linear as a whole and referred to also as the light string. Note that, the light emitter 30 is not limited thereto, and may be implemented by a plurality of light emitting elements each of which is a point light source and which collectively linearly emit light.

The optical fiber 31 is a flexible linear element, and includes a core made of acrylic resin and a clad made of fluorine-based resin, for example. The optical fiber 31 further includes the LED modules 32 respectively disposed at the opposite ends of the optical fiber 31, and configured to emit (produce) light evenly in the length direction. The light emitter 30 using such an optical fiber 31 and LED modules 32 emits light evenly in the length direction and, accordingly, the light lighting the sunshade 51 or the glass roof 52 is also even, presenting an excellent aesthetic effect.

As shown in FIG. 9, the light emitter 30 is formed of a first light emitter 30A bent at one part so as to be L-shaped as a whole, and a second light emitter 30B having the similar shape. One end of the first light emitter 30A and one end of the second light emitter 30B cross each other, and other end of the first light emitter 30A and other end of the second light emitter 30B cross each other. The light emitter 30 forms an annular shape as a whole disposed at different positions on the back side of the first bracket 20 along the frame shape of the first bracket 20. Note that, a single light emitter 30 may form an annular shape.

In this manner, the light emitter 30 is provided along the circumference edge of the headliner opening 11a.

The first light emitter 30A and the second light emitter 30B forming the light emitter 30 may have, for example, a circular cross section having a predetermined diameter, and has the length corresponding to the size of the roof opening 10a.

The light emitter 30 is disposed on the back side of the first bracket 20 and on the front side of the second bracket 40, and elastically held between the first bracket 20 and the second bracket 40. Note that, as shown in FIG. 10, while the LED modules 32 are disposed on the side outer than the first bracket 20 and the second bracket 40, and in the redundant space between the headliner 11 and the roof panel 12 which is not shown, the LED modules 32 may be disposed between the first bracket 20 and the second bracket 40. By virtue of the light emitter 30 being elastically held between the first bracket 20 and the second bracket 40, the light emitter 30 is positioned without being damaged, and wobbles little by vibrations of the vehicle. This structure further enhances the solidity of the assembly consisting of the first bracket 20, the second bracket 40, and the light emitter 30.

The second bracket 40 is a frame-like element whose inner shape is substantially identical to or slightly greater than the inner shape of the headliner opening 11a and the inner shape of the first bracket 20, or slightly greater than the inner shape of the first bracket 20, and formed of resin such as ABS.

Similarly to the first bracket 20, the second bracket 40 is painted black so as to prevent transmission of emitted light and excessive dispersion of reflected light.

The second bracket 40 is overlaid on the back side of the first bracket 20 so that the shape of a first bracket opening 20a and the shape of a second bracket opening 40a coincide with each other. The second bracket 40 is coupled to the first bracket 20 by screwing, ultrasonic welding, heat sealing or the like.

Figure 12:
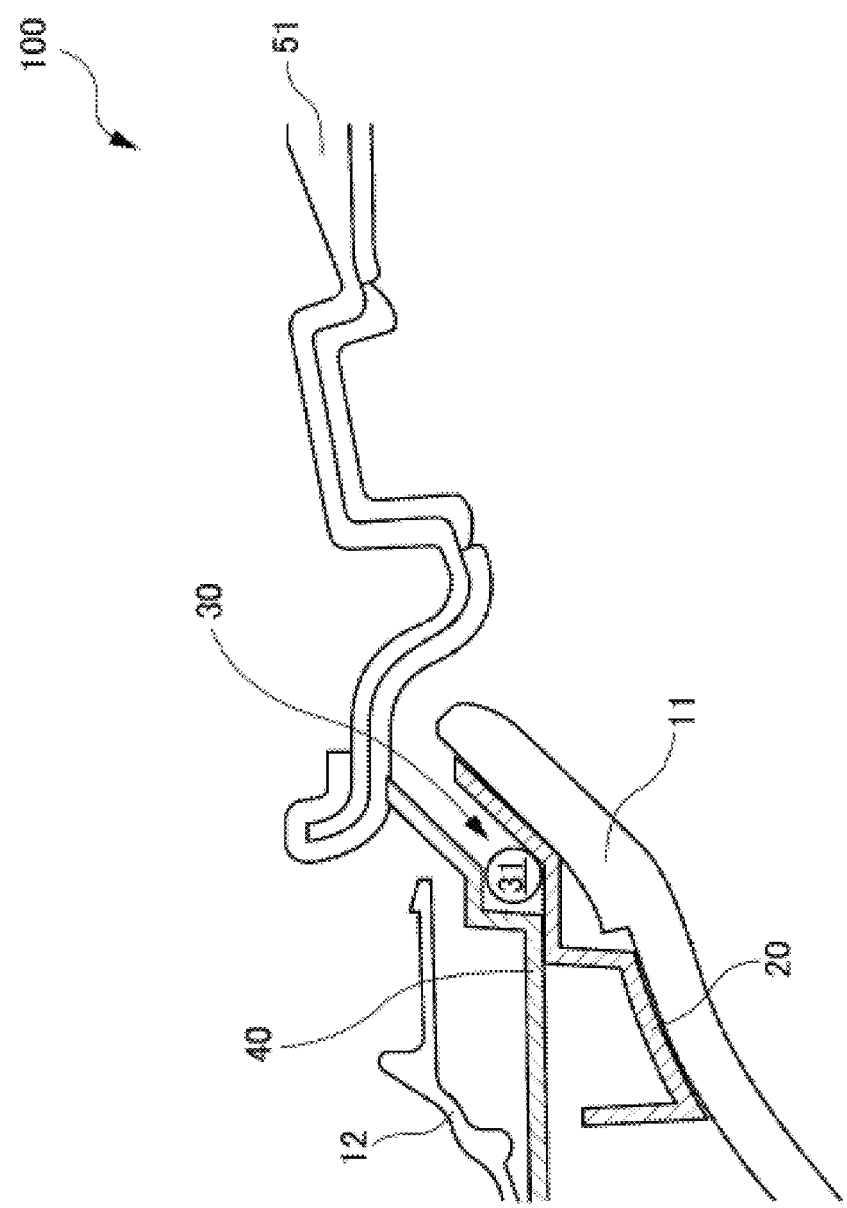
FIG. 12 is a cross-sectional view of the front part of the illumination structure with the sunshade being closed, and is a cross-sectional view taken along line B-B in FIG. 10.
Figure 13:
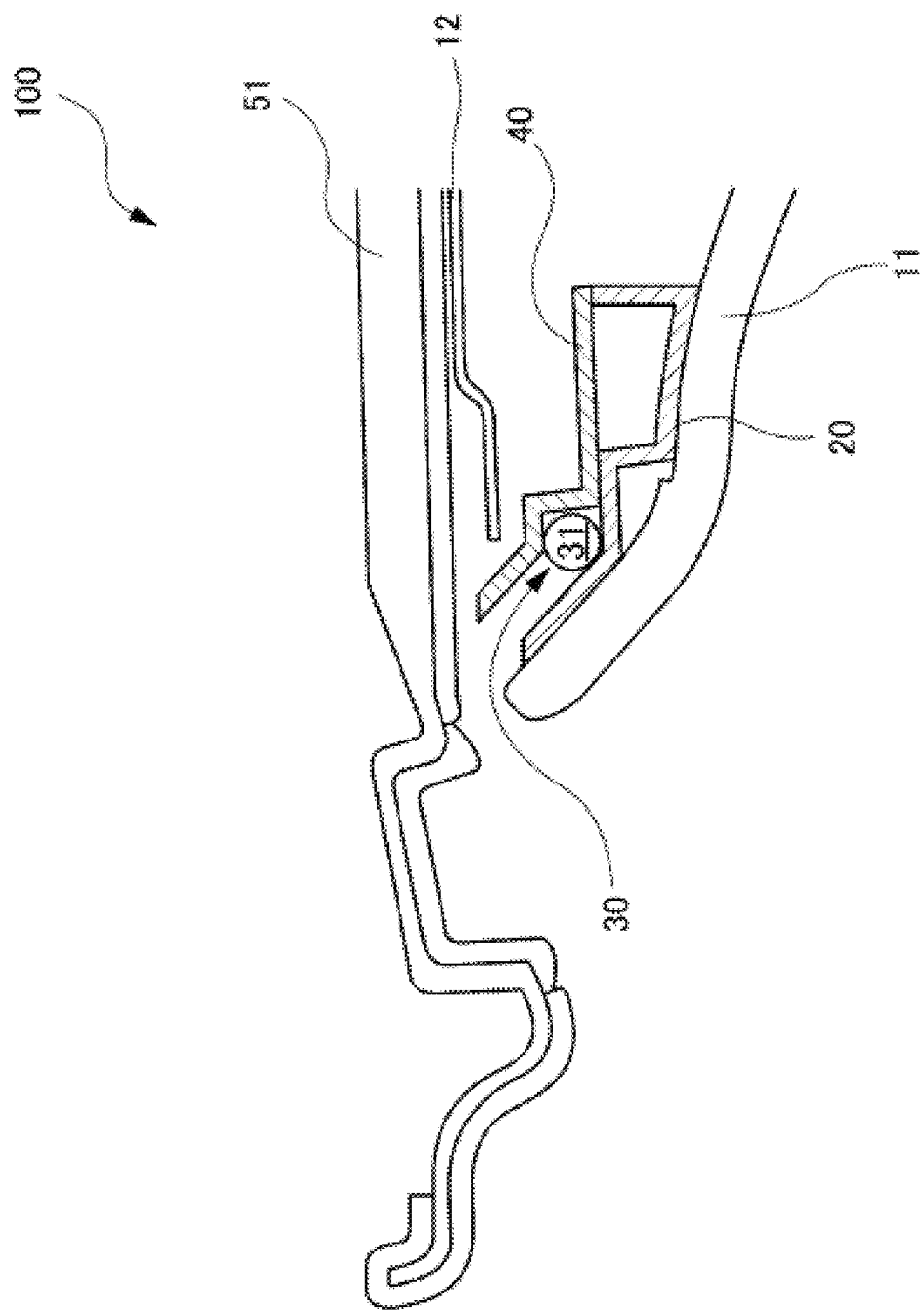
FIG. 13 is a cross-sectional view of the rear part of the illumination structure with the sunshade being open, and is a cross-sectional view taken along line C-C in FIG. 10.

Next, with reference to FIGS. 11 to 13, a further detailed description will be given of the illumination structure 100.

Figure 10:
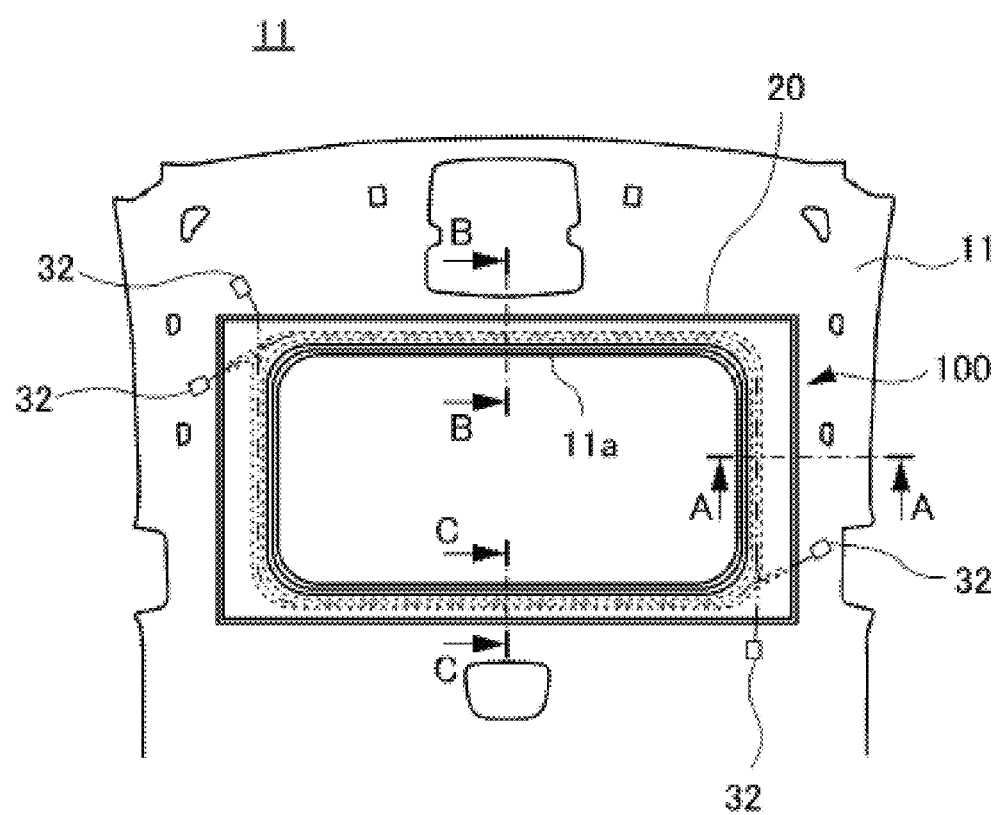
FIG. 10 is a plan view of the illumination structure when the headliner is looked down.
Figure 11:
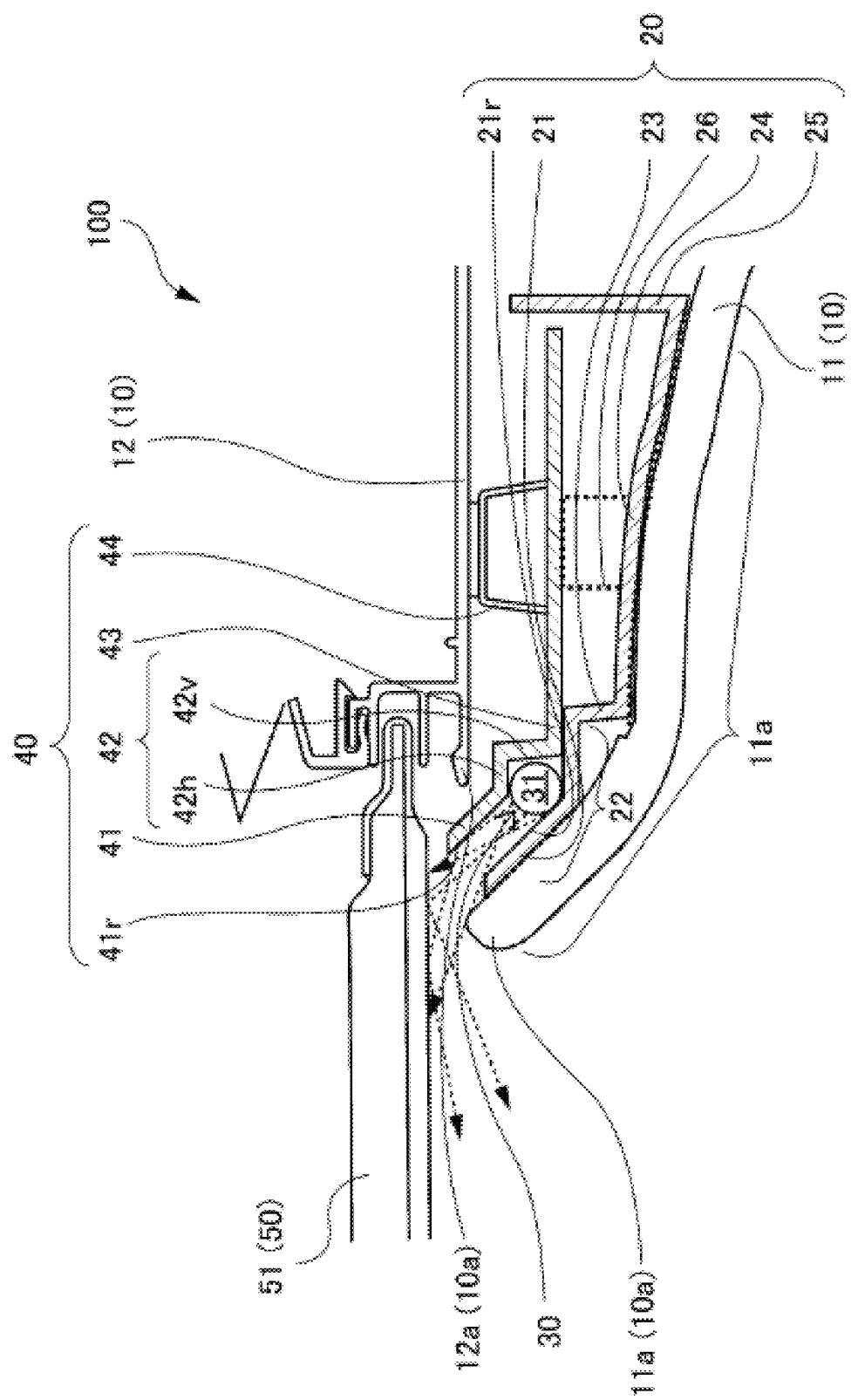
FIG. 11 is a cross-sectional view of the right part of the illumination structure with the sunshade being closed, and is a cross-sectional view taken along line A-A in FIG. 10.

FIG. 11 is a cross-sectional view taken along line A-A in FIG. 10, and is a cross-sectional view of the right part of the illumination structure 100 with the sunshade 51 being closed. FIG. 12 is a cross-sectional view taken along line B-B in FIG. 10, and is a cross-sectional view of the front part of the illumination structure 100 with the sunshade 51 being closed. FIG. 13 is a cross-sectional view taken along line C-C in FIG. 10, and is a cross-sectional view of the rear part of the illumination structure 100 with the sunshade 51 being open. Note that, as shown in FIGS. 11 to 13, respective cross-sectional shapes of the first bracket 20 and the second bracket 40 are substantially similar while they are slightly different in size in the front part, the rear part, the right part, and the left part relative to the roof opening 10a and, therefore, the reference characters are representatively shown in FIG. 11.

The first bracket 20 is annular as a whole (see FIG. 10). As shown in FIGS. 11 to 13, in the cross section thereof, the back side is not closed but is open, presenting an open cross section.

Specifically, as shown in FIG. 11, the first bracket 20 includes, at its inner circumferential edge, a first light guide part 21 including a back surface 21r inclined obliquely backward toward the sunshade 51 or the glass roof 52.

In this structure, the light emitted from the light emitter 30 is reflected at the back surface of the first light guide part 21 and guided toward the sunshade 51 or the glass roof 52. Therefore, the light from the light emitter 30 efficiently lights the sunshade 51 or the glass roof 52 without attenuating.

Further, the inclination angle of the first light guide part 21 is constant over a circumferential edge of the roof opening 10a. Thus, linear light is emitted with constant luminance and width along the circumferential edge of the roof opening 10a, exhibiting an excellent aesthetic effect.

The first bracket 20 includes a first recess 22 formed together with the first light guide part 21 and recessed frontward.

Further, the first bracket 20 includes a suspended part 23 continuous to the outer circumferential edge of the first recess 22 and extending substantially vertically from the back side to the front side (from the top to the bottom in FIG. 11), a horizontal part 24 continuous to the front side end of the suspended part 23 and extending substantially horizontally from the inner side to the outer side (from left to right in FIG. 11), and a flange part 25 continuous to the outer end of the horizontal part 24 and extending from the front side to the back side (from the bottom to the top in FIG. 11).

Such a cross section of the first bracket 20 increases the section modulus of the first bracket 20, and the first bracket 20 is coupled to the headliner opening 11a thereby efficiently reinforcing the headliner opening 11a.

The back surface of the first light guide part 21 and the back surface of the horizontal part 24 are coupled by any appropriate means such as heat sealing to the base member provided at the back surface of the headliner opening 11a.

On the back side of the horizontal part 24, a fixed part 26 fixed to the second bracket 40 is provided. Fixing means for fixing the fixed part 26 and the second bracket 40 to each other may be screwing, ultrasonic welding, heat sealing, an adhesive agent or the like.

The second bracket 40 is annular as a whole (see FIG. 10). As shown in FIG. 11, in the cross section of the second bracket 40, the back side is not closed but is open, presenting an open cross section.

Specifically, the second bracket 40 includes, at its inner circumferential edge, a second light guide part 41 including a front surface 41r inclined obliquely backward toward the sunshade 51 or the glass roof 52.

The second light guide part 41 extends between the circumferential edge of the headliner opening 11a and the circumferential edge of the roof panel opening 12a so as to block light from the light emitter 30.

Thus, the light from the light emitter 30 is blocked by the second light guide part 41, and the circumferential edge of the roof panel opening 12a behind the second light guide part 41 is not directly lit by the light. Therefore, the circumferential edge of the roof panel opening 12a will not be visually recognized inside the cabin by reflecting light, whereby an excellent aesthetic effect is exhibited. Further, in the state where the sunshade 51 is open also, the circumferential edge of the roof panel opening 12a will not be visually recognized inside the cabin by light reflecting at the glass roof 52, whereby an excellent aesthetic effect is exhibited. Still further, light emitted from the light emitter 30 is reflected at the front surface of the second light guide part 41 and guided toward the sunshade 51 or the glass roof 52. Therefore, the light from the light emitter 30 efficiently lights the sunshade 51 or the glass roof 52 without attenuating.

Additionally, while part of light emitted from the light emitter 30 directly lights the sunshade 51 or the glass roof 52, other part of light is blocked by the second light guide part 41 before reaching the sunshade 51 or the glass roof 52. This increases the contrast between the portion directly lit by the light and the portion shielded from the light in the sunshade 51 or the glass roof 52. This causes the portion directly lit by the light to appear distinguishingly sharp inside the cabin, exhibiting an excellent aesthetic effect.

Further, the second bracket 40 includes a second recess 42 recessed backward adjacent to the second light guide part 41. The second recess 42 is formed by, for example, a horizontal clamping part 42h continuous to the second light guide part 41 and extending substantially horizontally from the inner side to the outer side (from left to right in FIG. 11), and a vertical clamping part 42v continuous to the outer end of the horizontal clamping part 42h and extending from the back side to the front side (from the top to the bottom in FIG. 11).

Note that, the vertical clamping part 42v may not be exactly vertical and may gradually increase the angle from the back end toward the front end. Thus, after the light emitter 30 is disposed in the first recess 22 on the back side of the first bracket 20, as the second bracket 40 is shifted from the back side toward the front side of the first bracket 20, the light emitter 30 and the vertical clamping part 42v are brought into contact with each other, and the light emitter 30 guides the second bracket 40. Thus, the second bracket 40 is positioned to the right position. At the same time, the light emitter 30 is held between the first bracket 20 and the second bracket 40 without wobbling, and position to the right position.

Further, the second bracket 40 has a horizontal part 43 continuous to the front side end of the outer circumferential edge of the second recess 42 and extending substantially horizontally from the inner side to the outer side (from left to right in FIG. 11).

On the back side of the horizontal part 43, a fixed part 44 fixed to the roof panel 12 is provided. Fixing means for fixing the fixed part 44 and the roof panel 12 to each other may be a hook-and-loop fastener or the like.

The front side of the horizontal part 43 is fixed to the fixed part 26 of the first bracket 20.

Such a cross section of the second bracket 40 increases the section modulus of the second bracket 40, and the second bracket 40 in cooperation with the first bracket 20 coupled to the headliner opening 11a strongly reinforces the headliner opening 11a.

As has been described above, the light emitter 30 is linear, and disposed along the circumferential edge of the headliner opening 11a so as to be annular as a whole.

The light emitter 30 is held between the first recess 22 and the second recess 42.

By virtue of the light emitter 30 held between the first recess 22 and the second recess 42, the first bracket 20, the second bracket 40, the fixed part 44, and the light emitter 30 are integrated and the solidity thereof as a whole improves. Thus, the circumferential edge of the headliner opening 11a is further effectively reinforced.

Installing Method

Hereinafter, with reference to FIGS. 9 and 11, a description will be given of an exemplary method of installing the illumination structure 100 in the roof opening 10a of the roof 10 of a vehicle.

(1) Firstly, the first bracket 20 is disposed along the headliner opening 11a, and coupled to the back side of the headliner opening 11a by any appropriate means such as heat sealing.

(2) Next, in the first recess 22 of the first bracket 20, the optical fiber 31 of the light emitter 30 is disposed so that the first light emitter 30A and the second light emitter 30B form an annular shape.

(3) Subsequently, the second bracket 40 is overlaid on the back side of the first bracket 20 aligning the first bracket opening 20a and the second bracket opening 40a with each other. The optical fiber 31 of the light emitter 30 is held between the first recess 22 and the second recess 42 of the second bracket 40.

(4) The second bracket 40 is coupled to the back side of the first bracket 20 by any appropriate means.

(5) The assembly consisting of the first bracket 20, the second bracket 40, the light emitter 30, and the headliner 11 is mounted on the roof panel 12.

In this manner, the illumination structure 100 is installed at the roof 10 of the vehicle.

Note that, the method of installing the illumination structure 100 in the roof opening 10a of the roof 10 of the vehicle is not limited to the above-described example. For example, an assembly consisting of the first bracket 20, the second bracket 40, and the light emitter 30 may be provided. The assembly may be mounted on the roof panel 12, and thereafter the headliner 11 may be fixed to the front surface of the assembly mounted on the roof panel 12 by a hot melt adhesive. When the light emitter 30 is not employed, the light emitter 30 and the second bracket 40 may be omitted and the first bracket 20 may be directly mounted on the roof panel 12.

In the foregoing, while a detailed description has been given of a preferred embodiment of the present invention, the illumination structure of the present invention is not limited to the above-described embodiment, and various modifications and changes can be made within the scope of the spirit of the present invention recited in the claims.

In the present invention, the illumination structure includes the first bracket which is frame-shaped and coupled to the headliner along the circumferential edge of the headliner opening for reinforcing the headliner opening, a second bracket which is frame-shaped and coupled to the first bracket so as to be overlaid on the back side of the first bracket for reinforcing the roof opening in cooperation with the first bracket, and the light emitter held between the first bracket and the second bracket. Thus, the first bracket and the second bracket cooperating with each other serve both the functions of reinforcing the headliner opening and mounting and positioning the light emitter onto the headliner opening. Thus, the number of components is minimized and the roof opening has the simplified structure. Consequently, the illumination structure of the present invention presents a sophisticated enhanced appearance.

In the present invention, the illumination structure includes the first bracket which is frame-shaped and coupled to the headliner along the circumferential edge of the headliner opening for reinforcing the headliner opening, a second bracket which is frame-shaped and coupled to the first bracket so as to be overlaid on the back side of the first bracket for reinforcing the roof opening in cooperation with the first bracket, and the light emitter held between the first bracket and the second bracket. Thus, the design (structure) of the roof opening not including the light emitter and the design (structure) of the roof opening including the light emitter can share the identical first bracket. Further, the design (structure) of the roof opening including the light emitter easily implements the illumination structure by additionally including the light emitter and the second bracket.

In the present invention, light from the light emitter is emitted through the gap between the first bracket and the second bracket. Therefore, light from the light emitter is not diffused into the ambient space but is condensed between the first bracket and the second bracket to light the sunshade or the glass roof. Thus, the cabin interior is indirectly lit with the saved power. Further, light from the light emitter is emitted through the gap between the first bracket and the second bracket. Therefore, the light sharply lights the sunshade or the glass roof by the width corresponding to the gap between the first bracket and the second bracket, and reflects clearly when the sunshade or the glass roof is directly seen. Thus, an excellent aesthetic effect is exhibited.

In the present invention, the light emitter includes the side emitting optical fiber and the LED modules provided at the ends of the optical fiber. Therefore, the light emitter evenly emits light along its length direction, and reflects clearly when the sunshade or the glass roof is directly seen. Thus, an excellent aesthetic effect is exhibited.

In the present invention, the light emitter is disposed along the circumferential edge of the roof opening. This structure in conjunction with the shape of the headliner opening presents the headliner opening distinguishingly, exhibiting an excellent aesthetic effect.

In the present invention, the first bracket includes the first light guide part including, at its inner circumferential edge, the back surface inclined obliquely backward toward the sunshade or the glass roof. Therefore, light emitted from the light emitter reflects at the back surface of the first light guide part and guided toward the sunshade or the glass roof. Thus, the light from the light emitter efficiently lights the sunshade or the glass roof without attenuating, exhibiting a power-saving effect. The light reflects clearly and exhibits an excellent aesthetic effect.

In the present invention, the second bracket includes the second light guide part including, at its inner circumferential edge, the front surface inclined obliquely backward toward the sunshade or the glass roof. Therefore, light emitted from the light emitter reflects at the front surface of the second light guide part and guided toward the sunshade or the glass roof. Thus, the light from the light emitter efficiently lights the sunshade or the glass roof without attenuating, exhibiting a power-saving effect. Further, the light reflects clearly and exhibits an excellent aesthetic effect.

In the present invention, the first bracket includes the first recess formed together with the first light guide part and recessed frontward. The second bracket includes the second recess recessed backward adjacent to the second light guide part. The light emitter is held between the first recess and the second recess. The first recess and the second recess contribute to improving the solidity of the first bracket and the second bracket and, additionally, also function to hold and position the light emitter. Further, by virtue of the light emitter being held between the first bracket and the second bracket, the first bracket, the second bracket, and the light emitter are integrated and the solidity thereof as a whole improves. Thus, the circumferential edge of the headliner opening is further effectively reinforced. Further, the illumination structure formed of the first bracket, the second bracket, the light emitter and the like itself serves as a reinforcing structure that reinforces the circumferential edge of the headliner opening. Therefore, the reinforcing structure is entirely covered with the back side of the headliner opening and, consequently, the structure of the roof opening presents a sophisticated enhanced appearance.

In the present invention, the second light guide part extends between the circumferential edge of the headliner opening and the circumferential edge of the roof panel opening so as to block light from the light emitter. Thus, the light from the light emitter is blocked by the second light guide part, and the circumferential edge of the roof panel behind the second light guide part is not directly lit by the light. Therefore, the circumferential edge of the roof panel will not be visually recognized inside the cabin by reflecting light, whereby an excellent aesthetic effect is exhibited. Further, in the state where the sunshade is open also, the circumferential edge of the roof panel will not be visually recognized inside the cabin by light reflecting at the glass roof, whereby an excellent aesthetic effect is exhibited. Still further, while part of light emitted from the light emitter directly lights the sunshade or the glass roof, other part of light is blocked by the second light guide part before reaching the sunshade or the glass roof. This increases the contrast between the portion directly lit by the light and the portion shielded from the light in the sunshade or the glass roof. This causes the portion directly lit by the light to appear distinguishingly sharp inside the cabin, whereby an excellent aesthetic effect is exhibited.

In the present invention, the inclination angle is constant over the circumferential edge of the opening. Therefore, linear light is emitted with constant luminance and width along the circumferential edge of the roof opening onto the sunshade or the glass roof. Thus, the light reflects clearly, and an excellent aesthetic effect is exhibited.

REFERENCE SIGNS LIST

10: roof
10a: roof opening
11: headliner
11a: headliner opening
12: roof panel
12a: roof panel opening
20: first bracket
21: first light guide part
21r: back surface
22: first recess
23: suspended part
24: horizontal part
25: flange part
26: fixed part
30: light emitter
31: optical fiber
40: second bracket
41: second light guide part
41r: front surface
42: second recess
42h: horizontal clamping part
42v: vertical clamping part
43: horizontal part
44: fixed part
50: sunroof
51: sunshade
100: illumination structure

The invention claimed is:

1. An illumination structure lighting a roof opening of a roof of a vehicle, the illumination structure comprising:
    a roof panel including a roof panel opening;
    a headliner including a headliner opening and covering a lower surface of the roof panel;
    a first bracket being frame-like and coupled to the headliner along a circumferential edge of the headliner opening for reinforcing the headliner opening;
    a second bracket being frame-like and coupled to the first bracket so as to be overlaid on a back side of the first bracket for reinforcing the headliner opening in cooperation with the first bracket; and
    a light emitter held between the first bracket and the second bracket and emitting light through a gap between the first bracket and the second bracket.

2. The illumination structure according to claim 1, wherein the light emitter includes a side emitting optical fiber, and an LED module provided at an end of the optical fiber.

3. The illumination structure according to claim 1, wherein the first bracket includes, at its inner circumferential edge, a first light guide part including a back surface inclined obliquely backward toward a sunshade or a glass roof provided at the roof opening.

4. The illumination structure according to claim 1, wherein the second bracket includes, at its inner circumferential edge, a second light guide part including a front surface inclined obliquely backward toward a sunshade or a glass roof provided at the roof opening.

5. The illumination structure according to claim 1, wherein
    the first bracket includes
        a first light guide part disposed at an inner circumferential edge of the first bracket and including a back surface inclined obliquely backward toward a sunshade or a glass roof provided at the roof opening, and
        a first recess recessed frontward,
    the second bracket includes
        a second light guide part disposed at an inner circumferential edge of the second bracket and including a front surface inclined obliquely backward toward a sunshade or a glass roof provided at the roof opening, and
        a second recess recessed backward adjacent to the second light guide part, and the light emitter is held between the first recess and the second recess.

6. The illumination structure according to claim 4, wherein the second light guide part extends between the circumferential edge of the headliner opening and a circumferential edge of the roof panel opening so as to block light from the light emitter.

7. The illumination structure according to claim 3, wherein an inclination angle of the back surface of the first light guide part is constant over a circumferential edge of the roof opening.

8. The illumination structure according to claim 4, wherein an inclination angle of the front surface of the second light guide part is constant over a circumferential edge of the roof opening.

9. The illumination structure according to claim 2, wherein the first bracket includes, at its inner circumferential edge, a first light guide part including a back surface inclined obliquely backward toward a sunshade or a glass roof provided at the roof opening.

10. The illumination structure according to claim 2, wherein the second bracket includes, at its inner circumferential edge, a second light guide part including a front surface inclined obliquely backward toward a sunshade or a glass roof provided at the roof opening.

11. The illumination structure according to claim 2, wherein
the first bracket includes
a first light guide part disposed at an inner circumferential edge of the first bracket and including a back surface inclined obliquely backward toward a sunshade or a glass roof provided at the roof opening, and
a first recess recessed frontward, the second bracket includes
a second light guide part disposed at an inner circumferential edge of the second bracket and including a front surface inclined obliquely backward toward a sunshade or a glass roof provided at the roof opening, and
a second recess recessed backward adjacent to the second light guide part, and the light emitter is held between the first recess and the second recess.

12. The illumination structure according to claim 5, wherein the second light guide part extends between the circumferential edge of the headliner opening and a circumferential edge of the roof panel opening so as to block light from the light emitter.

13. The illumination structure according to claim 5, wherein an inclination angle of the back surface of the first light guide part is constant over a circumferential edge of the roof opening.

14. The illumination structure according to claim 5, wherein an inclination angle of the front surface of the second light guide part is constant over a circumferential edge of the roof opening.

* * * * *